United States Patent
Sun et al.

(10) Patent No.: US 9,313,138 B2
(45) Date of Patent: Apr. 12, 2016

(54) DEVICES, SYSTEMS, AND METHODS FOR ADAPTIVE SWITCHING OF MULTICAST CONTENT DELIVERY TO OPTIMIZE BANDWIDTH USAGE

(75) Inventors: Wendell Sun, San Diego, CA (US); Steven Anderson, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 204 days.

(21) Appl. No.: 13/588,852

(22) Filed: Aug. 17, 2012

(65) Prior Publication Data
US 2014/0050082 A1 Feb. 20, 2014

(51) Int. Cl.
| | |
|---|---|
| H04L 12/28 | (2006.01) |
| H04L 12/811 | (2013.01) |
| H04L 12/853 | (2013.01) |
| H04L 29/06 | (2006.01) |
| H04N 21/2343 | (2011.01) |
| H04N 21/24 | (2011.01) |
| H04J 1/16 | (2006.01) |

(52) U.S. Cl.
CPC .......... *H04L 47/38* (2013.01); *H04L 47/2416* (2013.01); *H04L 65/4076* (2013.01); *H04L 65/605* (2013.01); *H04N 21/23439* (2013.01); *H04N 21/2402* (2013.01)

(58) Field of Classification Search
CPC ......... H03M 7/30; H04L 12/18; H04L 47/38; H04N 21/26616; H04N 21/2662; H04N 7/26; H04N 7/26069; H04N 7/26159; H04N 7/2602
USPC ................................... 370/252, 389, 386, 487
See application file for complete search history.

(56) References Cited

U.S. PATENT DOCUMENTS

| | | | |
|---|---|---|---|
| 7,870,590 B2 | 1/2011 | Jagadeesan et al. | |
| 8,554,941 B2 * | 10/2013 | Ramakrishnan ... | H04N 7/17318 709/203 |
| 2007/0217436 A1 * | 9/2007 | Markley et al. ............... | 370/401 |
| 2008/0152312 A1 * | 6/2008 | Levy et al. .................... | 386/108 |
| 2010/0118697 A1 * | 5/2010 | Shumate ....................... | 370/230 |
| 2011/0072105 A1 * | 3/2011 | Biderman .......... | H04N 7/17318 709/217 |
| 2011/0154391 A1 * | 6/2011 | Velazquez et al. .............. | 725/33 |
| 2012/0063462 A1 * | 3/2012 | Hu et al. ........................ | 370/394 |
| 2012/0170501 A1 * | 7/2012 | Drozt .................. | H04W 72/005 370/312 |
| 2012/0185899 A1 * | 7/2012 | Riedl et al. ..................... | 725/35 |

* cited by examiner

*Primary Examiner* — John Pezzlo
(74) *Attorney, Agent, or Firm* — Fenwick & West LLP

(57) ABSTRACT

Systems, devices and methods for adaptive switching in multicast media streams are disclosed herein. In an embodiment, a method for adaptively transmitting content to one or more users based on currently available bandwidth via internet protocol ("IP") multicast protocol, includes: receiving a first content stream having a plurality of data packets, the first content stream encoded at a first bit rate; receiving a second content stream having a plurality of data packets, the second content stream encoded at a second bit rate, wherein the first bit rate is different than the second bit rate and wherein the first and second content streams represent the same content; transmitting the first content stream to a user; determining that the user could receive the second content stream based on available bandwidth for transmitting data to the user; and transmitting the second content stream to the user.

17 Claims, 5 Drawing Sheets

DEVICES, SYSTEMS, AND METHODS FOR ADAPTIVE SWITCHING OF MULTICAST CONTENT DELIVERY TO OPTIMIZE BANDWIDTH USAGE

CROSS-REFERENCE TO RELATED APPLICATIONS

The present application is related to co-pending U.S. patent application Ser. No. 13/588,885, filed concurrently herewith and titled "ENCODER-AIDED SEGMENTATION FOR ADAPTIVE STREAMING," and U.S. application Ser. No. 13/397,774 entitled "ALGORITHMIC MEDIA STREAM SELECTION," both of which are incorporated herein by reference in their entirety.

FIELD

The disclosure relates generally to the field of data transmission over digital networks, and more specifically to systems, devices and methods for adaptive switching in multicast media streams.

BACKGROUND

By way of background, Internet Protocol Television ("IPTV") is a system in which digital television service is delivered by using internet protocol over a network infrastructure, which may include delivery by a broadband connection. A general definition of IPTV is television content that, instead of being delivered through traditional broadcast and cable formats, is received by the viewer through the technologies used for computer networks.

For residential users, IPTV is often provided in conjunction with Video on Demand ("VOD") and may be bundled with internet services such as web access and Voice over Internet Protocol ("VoIP"). In businesses, IPTV may be used to deliver television content over corporate Local Area Networks ("LANs").

IPTV covers both live TV (e.g., multicasting) as well as stored video (e.g., VOD). The playback of IPTV generally requires either a personal computer or a set-top box connected to a TV. Video content is typically compressed using either a MPEG-2 or a MPEG-4 codec and then sent in a Moving Pictures Expert Group ("MPEG") transport stream delivered via IP multicast in case of live TV or via IP Unicast in case of VOD. IP multicast or IP multicast protocol is a method in which information or content can be sent to multiple computers at the same time. In IP multicast protocol, each program channel ($P_x$) may be defined as one multicast group, with the client watching the program via Internet Group Management Protocol's ("IGMP's") join/leave commands. IGMP is described in further detail in IETF Standard, RFC3376, "Internet Group Management Protocol, Version 3", October 2002, incorporated herein by reference in its entirety.

Generally, in most broadband services, (e.g., Digital Subscriber Line ("DSL") using twisted telephone wire or cable modem using coaxial cable), the last mile between an edge router and home gateway (hereinafter referred to as "the last mile" or "the last mile bandwidth") is the bottleneck of bandwidth availability. For example, the AT&T U-verse service is limited to offer only 2 High Definition ("HD") and 2 Standard Definition ("SD") channels simultaneously due to DSL bandwidth limitations. This last mile bandwidth availability varies depending upon the physical distance and the signal quality (impairments) from home to home. Consequently, the content compression parameters have to be adjusted accordingly and video quality will be compromised in order to deliver the committed service, such as 2 HD and 2 SD channels, to all homes.

The present disclosure contemplates new devices, systems and methods that minimize and/or resolve the above-referenced difficulties and others.

BRIEF SUMMARY

Accordingly, there is provided herein devices, systems and methods that allow for adaptive switching in multicast transmission streams. In one embodiment, an adaptive switching component that may be configured to monitor bandwidth and switch data streams being transmitted to users based on available bandwidth is provided.

In one embodiment, a method for adaptively transmitting content to one or more users based on currently available bandwidth via internet protocol ("IP") multicast protocol, includes: receiving a first content stream having a plurality of data packets, the first content stream encoded at a first bit rate; receiving a second content stream having a plurality of data packets, the second content stream encoded at a second bit rate, wherein the first bit rate is different than the second bit rate and wherein the first and second content streams represent the same content; transmitting the first content stream to a user; determining that the user could receive the second content stream based on available bandwidth for transmitting data to the user; and transmitting the second content stream to the user.

In another embodiment, a system for adaptively transmitting content to one or more users, includes: a content server having a processor that conditions a multicast data stream such that one or more packets include a switching identifier, the multicast data stream including a first data stream having a first bit rate and a second data stream having a second bit rate, where the first bit rate and the second bit rate are different; and an edge router that receives the multicast data stream from the content server, the edge router being configured to inspect the packets in the multicast data stream for the switching identifiers and determine which data stream to transmit to the one or more users.

In yet another embodiment, an electronic device for adaptively transmitting content to one or more users includes: a controller configured to instruct the device to perform adaptive switching of content streams when sufficient bandwidth is available and a switching point is identified; a communication unit configured to receive and/or transmit content from an external source; a memory unit configured to communicate with the controller and receive and/or transmit content from the communication unit; a bandwidth monitoring module configured to determine when there is a need to either reduce or increase a content stream's bandwidth based on prevailing segment conditions or congestion; and a switching module configured to inspect the content streams for appropriate switching points.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the invention.

DETAILED DESCRIPTION

In the present disclosure, there is provided a method and system for adaptively transmitting content to one or more users. The system may include a content server that prepares multicast data streams with switching identifiers placed at predetermined intervals and transmits the data streams to one or more users. At the user end of the system, an adaptive switching component may be configured to inspect the data streams for switching identifiers and determine which data stream to transmit to the one or more users at any given time based on the available bandwidth to the one or more users.

In the past few decades, advances in the related fields of video compression and video transmission systems have led to the widespread availability of digital video programs transmitted over a variety of communication systems and networks. Most recently, new technologies have been developed that have allowed television programs to be transmitted as multicast, e.g., IP multicast, digital bit streams of multiplexed video and audio signals delivered to users or client subscribers over packet switched networks.

IP multicast is a technique for one-to-many communication over an IP infrastructure in a network. IP multicast scales to a larger receiver population by not requiring prior knowledge of whom or how many receivers there are. Multicast uses network infrastructure efficiently by requiring the source to send a packet only once, even if it needs to be delivered to a large number of receivers. The nodes in the network take care of replicating the packet to reach multiple receivers only when necessary.

Figure 1:
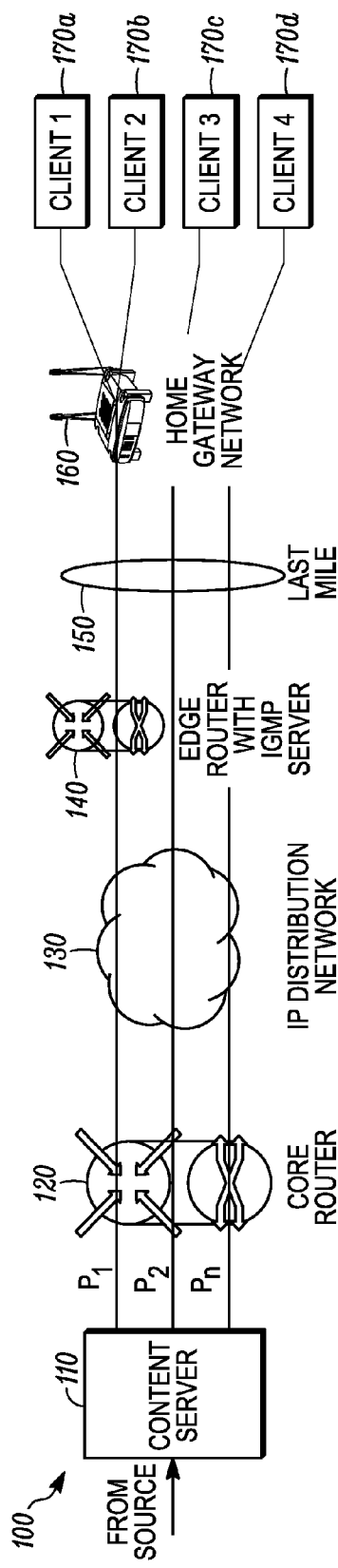
FIG. 1 is a functional block diagram illustrating an example flow of content in a system from a content server to a plurality of end users or clients in accordance with an embodiment.

Referring to FIG. 1, an example flow of content in a system 100 from a content server to a plurality of end users or clients is shown. System 100 generally includes a content server 110, a core router 120, an IP distribution network 130, an edge router 140, a home gateway 160, and one or more clients 170a, 170b, 170c, 170d. Also shown is a last mile network 150 located between edge router 140 and home gateway 160. As explained above, the last mile network 150 is generally the bottleneck of bandwidth availability in system 100.

As will be understood by those of skill in the art, content server 110 generally provides the content for system 100. Content may include, for example, audio, video, or other data information provided in, e.g., packet format. Core router 120 may generally receive packet content from content server 110 and reads the address information in the packets to determine their ultimate destination. Then, using information in, e.g., a routing table or routing policy, core router 120 can direct the packets to IP network 130.

IP network 130 may generally be a network of one or more computers using Internet Protocol for their communication protocol. Similar to core router 120, edge router 140 can direct packets from IP network 130.

When transmitting data packets over a network, a last head-end (or central office, point of presence, corporate gateway, or the like) is typically reached, this services a number of users on a data channel, with a head-end router. Such data channels having a single head-end serving a number of users are sometimes referred to as shared data channels. A head-end router is at the "head-end" of a given shared channel and serves as the communications interface with external networks. In this capacity, a head-end router routes data packets received to the appropriate user and also prioritizes and schedules data packets for routing to users. In some embodiments, edge router 140 may comprise a head-end router. In some embodiments, core router 120 may comprise a head-end router. In such embodiments, core router 120 may serve as an entry point to the "managed" part of the overall network.

After a data packet is received by the head-end, the head-end router then passes the data onto the appropriate user on the shared channel, e.g., home gateway 160. A bottleneck can occur at this point if the available bandwidth is insufficient to satisfy the demand (e.g., transmission bandwidth on the channel itself or transmission and/or processing bandwidth of the router or head-end), resulting in queuing of "downstream" packets (e.g., packets destined for a user of the shared channel serviced by the head-end).

As an example, in the AT&T Uverse$^{SM}$ service, there is usually a head-end router and a kiosk on the street with VDSL2 DSL transmitters. It is the bandwidth between the head-end router and the gateway in the home that, in general, is the congested part of the network. As will be described in more detail below, both bandwidth monitoring and switching may reside here (e.g., at head-end router) or switching may be here and bandwidth monitoring may be in the home gateway. As an example, using an edge router at the kiosk, the edge router may perform the switching and monitoring functions or just the switching function. Also, in some embodiments, the edge router could broadcast a forced tune multicast message on e.g., a well-known multicast address. In general, whatever segment is being monitored, the switching of multicast streams occurs on that segment only.

For example, a plurality of users may be attached to a given head-end, which itself is coupled to IP network 130. One of the users may request a program from content server 110. This program may be routed through the IP network 130 in the form of packets, and ultimately delivered to the user's own head-end. The head-end then typically immediately routes the packets to the recipient/user with the head-end router, if possible, or queues them in a buffer (typically, a first-in, first out (FIFO) buffer) if other packets are currently occupying the shared channel.

As shown in FIG. 1, edge router 140 may include an additional or integral IGMP server. In some embodiments, multicast content delivery may use IGMP for control and IP multicast for media delivery. The IGMP server generally can be used to establish multicast group memberships in system 100. For example, Client 1 170a and Client 2 170b may be viewed as in the same group for viewing in system 100. As shown, each program channel (Px) may be defined as one multicast group, with the clients 170a-d watching a program via IGMP's "join"/"leave" command. In FIG. 1, Client 1

170*a* and Client 2 170*b* will watch the same program P1, while Client 3 170*c* watches P2 and Client 4 170*d* watches Pn.

In some embodiments, home gateway 160 is a residential local area network ("LAN") for communication between digital devices typically deployed in the home, e.g., personal computers and accessories (e.g., printers and mobile computing devices). It should be appreciated that home gateway 160 may include all or a portion of digital devices within a user's home. Alternatively, home gateway 160 may be defined to include a broader range of devices, such as a set of homes within a community, etc.

Referring back to Clients 1-4 170*a-d*, as shown, Client 1 170*a* and Client 2 170*b* are part of the same LAN. For example, Client 1 170*a* and Client 2 170*b* may be a computer and a set top box for television operating within a first user's home. Client 3 170*c* may be a set top box operating within a second user's home and Client 4 170*d* may be a set top box operating within a third user's home.

Because the last mile bandwidth availability varies depending on the physical distance, signal quality from home to home (e.g., Client 1-2 170*a-b* and Client 3 170*c* and Client 4 170*d*), and number of active users, it may be desirable to adjust the content compression parameters accordingly to provide the committed service to all homes. However, when more bandwidth is available, it would be preferable to deliver improved quality to active users by further adjusting the content compression. This may be achieved, in some embodiments, through adaptive switching of content prepared with multiple bit rates. Alternately, in an example, when Clients 2-4 170*b-d* are not active, Client 1 170*a* may utilize the whole pipe solely. Adaptive switching of content to a higher bit rate for Client 1 170*a* may be performed in such an instance.

Figure 2:
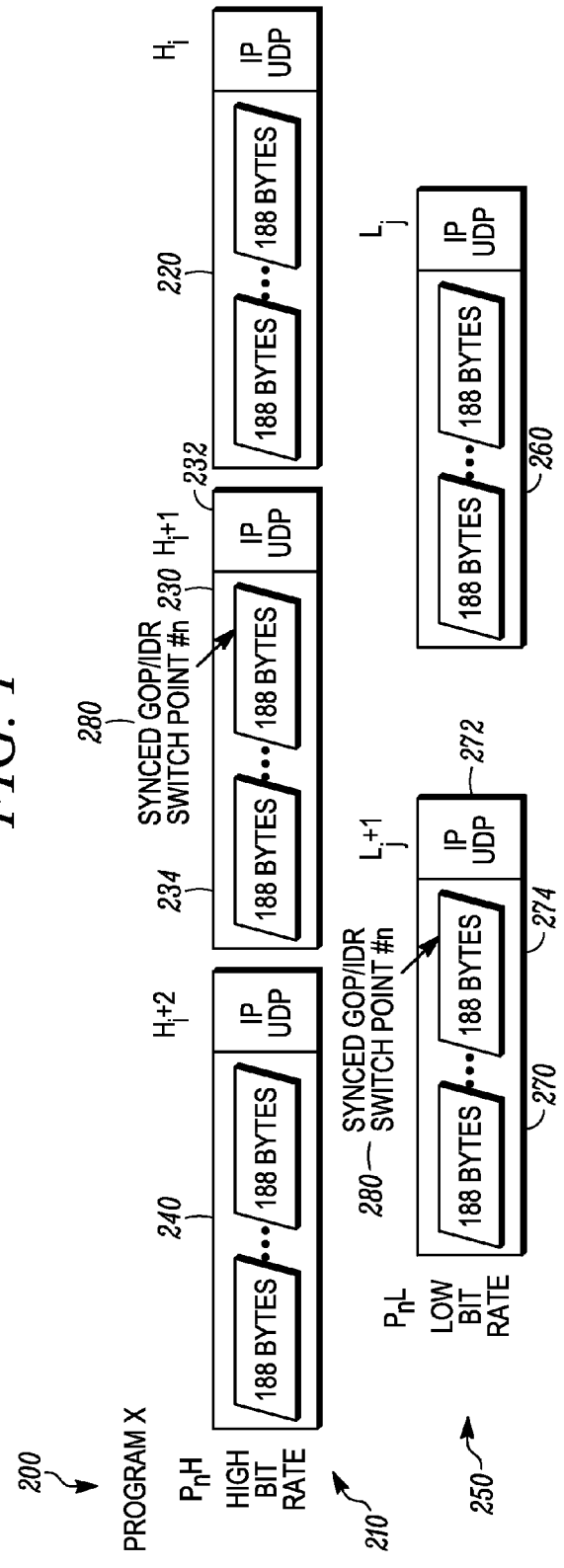
FIG. 2 is a functional block diagram illustrating an example structure a program encoded in multiple bit rates in accordance with an embodiment.

Referring now to FIG. 2, a functional block diagram illustrating an example structure of a program encoded in multiple bit rates is shown. In FIG. 2, an MPEG-2 transport packet having a length of 188 bytes is shown. A desirable feature of MPEG-2 encoding is its ability to remove redundancy, not only within a frame, but also among a group of frames. Generally, MPEG-2 uses three frame types (I, P, and B) to represent video. A group of pictures ("GOP") setting defines the pattern of the three frame types used.

The intra-frame ("I-frame") is also known as the key frame. Every GOP includes one I-frame. The I-frame is the only MPEG-2 frame type which can be fully decompressed without any reference to frames that precede or follow it. It is also the most data-heavy, requiring the most bandwidth or bitrate. If a user wants to place an I-frame at a scene change or some other specific frame location, the user must manually set it. This is known as a forced I-frame.

The predicted-frame ("P-frame") is encoded from a "predicted" picture based on the closest preceding I- or P-frame. P-frames typically require much less bandwidth or bitrate than do I-frames because they reference a preceding I- or P-frame in the GOP.

Both I-frames and P-frames are also known as reference frames, because a bi-directional-frame ("B-frame") may refer to either one or both frame types. The B-frame is encoded from an interpolation of succeeding and preceding reference frames, either I-frame or P-frame. B-frames are the most storage-efficient MPEG-2 frame type, requiring the least amount of bandwidth or bitrate.

A major feature of MPEG-2 encoding is its ability to remove redundancy, not only within a frame, but also among a group of frames; the use of B- and P-frames is what allows MPEG-2 to remove temporal redundancy, contributing to its ability to compress video efficiently. A more thorough discussion relating to MPEG-2 and its contents is provided below in the description of FIG. 3.

As is known to those of ordinary skill in the art, the use of adaptive streaming may prepare content e.g., video content, such that the same content is encoded in multiple bit rate streams. Generally, the higher the bit rate, the better the content quality. Any suitable generic video encoding process, e.g., software and hardware, known by one skilled in the art may be utilized. In some embodiments, the encoding is performed in the content server box.

In FIG. 2, a program X 200 is shown as being encoded in multiple bit rates. In this particular example, program X 200 may have a high bit rate structure stream 210 and a low bit rate structure stream 250. Consequently, for each program Pn there will be PnH and PnL structure (e.g., for program 1, there will be P1H, P1L; for program 2 there will be P2H, P2L, etc.).

In some embodiments, in the encoding process, the GOP/I-frame alignment is maintained amongst the streams 210, 250. In some embodiments, the I-frame is an instantaneous decoder refresh ("IDR") frame. An IDR frame is a special kind of I-frame used in MPEG-4 AVC encoding. Generally, frames following an IDR frame may not refer back to frames preceding the IDR frame. For seamless switch from one bit rate to another, an IDR frame may be desirable. As used herein, "alignment amongst streams" means the IDR frames with same presentation timestamp ("PTS") on all bit rate streams represent identical scene content.

In the example of FIG. 2, in high bit rate data structure stream 210 there are three packets shown 220, 230 and 240. Each packet 220-240 includes a similar structure, with an IP or User Datagram Protocol ("UDP") header portion 232 and the transport packet portion 234, being shown for packet 230. Similarly, in low bit rate data structure stream 250, there are two packets shown 260 and 270. Each packet 220-240 includes a similar structure, with an IP or User Datagram Protocol ("UDP") header portion 272 and the transport packet portion 274, being shown for packet 270.

Because GOP/I-frame alignment is maintained amongst the streams 210, 250, the client can seamlessly switch from one bit rate stream to another when playing back if switching occurs at a suitable or predetermined switching point. In some embodiments, a suitable switching point may be at a defined boundary of the closed GOP/I-frame (e.g., at the beginning of the header portion 232, 272), shown as reference numeral 280. In some embodiments, a switching identifier or switching point may be carried as the first media frame in a media payload packet in an IP packet. For example, in FIG. 3(*a*), 310*a* may be an informational packet, and then 310*b*, which starts with an IDR frame, may be a media packet. In such an example, the beginning of the whole IP packet is a switching point identified by a switching identifier.

In some embodiments, if the content server 110 is streaming content to a first user at a high bit rate, e.g., stream 210, and a second user requests bandwidth, thereby reducing the bandwidth available to the first user, the switch function in either edge router or the head-end router can switch the content stream to the first user at a low bit rate, e.g., stream 250, to be able to accommodate both user requests. Consequently, with adaptive streaming, a user can view better video when bandwidth is sufficient, (e.g., less program channels or better last mile connection), or get more channels with low bit rate (but still acceptable) program quality.

In addition to the multiple bit rate encoding, the encoding process may also maintain one or more of the following for each program Pn: synchronization of GOP/I-frame among program streams; use of the same encryption key for all similar program multi-rate streams; line up GOP/I-frame switch boundary at beginning of IP multicast packet, add an identifier, e.g. sequence number, of GOP/I-frame switch boundary to co-relate the GOP/I-frame switch boundary among multi-rate streams; and indicate the GOP/I-frame switch boundary in IP header or some location where can be easily inspected in MPEG-2 header portion.

As mentioned above, digital television signals are typically transmitted over packet networks as MPEG-2 data streams. Each MPEG-2 single program transport stream normally comprises data for a single television programs channel. Each transport stream consists of a set of sub-streams, commonly known as elementary streams, which contain packets of audio, video, or other data information encapsulated in the MPEG-2 stream. Each of these elementary streams has a Packet Identifier ("PID") that uniquely identifies that stream within the larger transport stream.

Figure 3A:
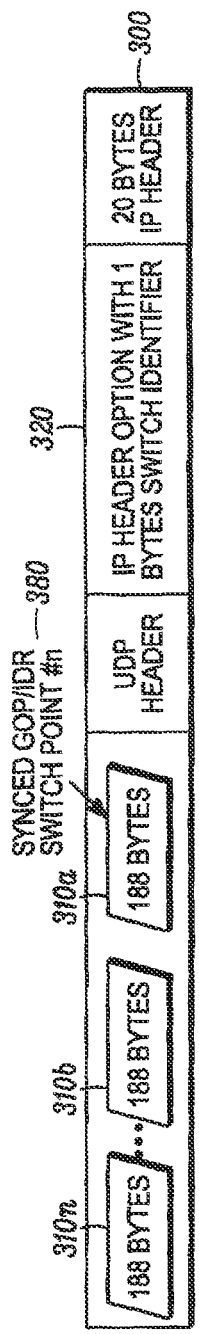
FIG. 3 is a functional block diagram illustrating an example structure of a program having adaptive switch identifiers located in accordance with an embodiment.
Figure 3B:
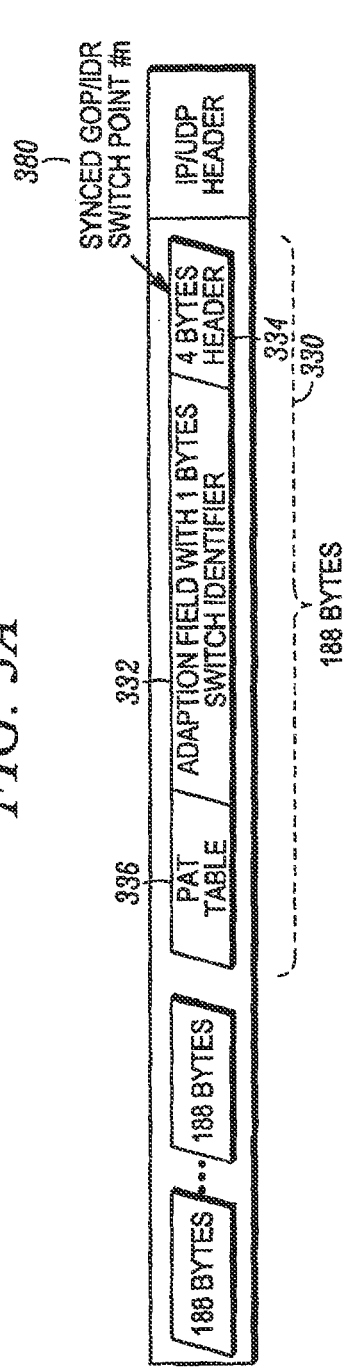
Figure 3C:
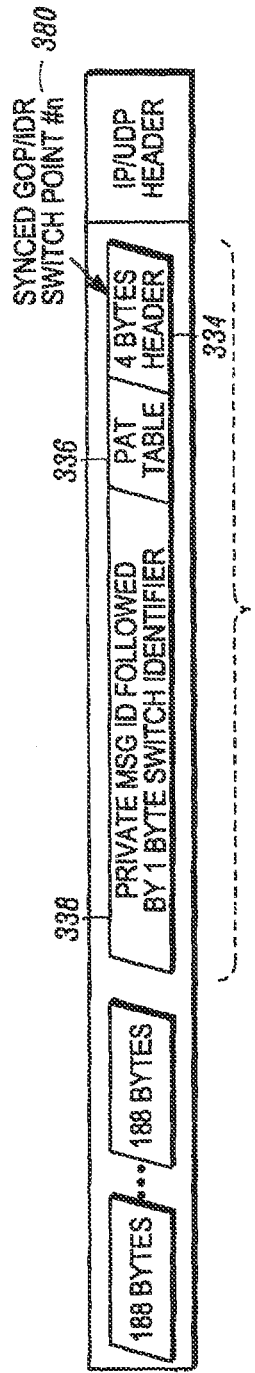

Referring now to FIG. 3, a functional block diagram illustrating an example structure of a program having adaptive switch identifiers in the packet stream is shown. In FIG. 3, FIGS. 3A, 3B, and 3C represent three different ways to carry and signal a switching identifier. As can be seen, each MPEG-2 transport packet 310 in the packet stream 300 is 188 bytes long. The packet stream 300 may additionally include one or more header/header options 320. Similar to FIG. 2, a suitable switching point or switching identifier 380 is embedded in the IP multicast stream. In some embodiments, an out-of-band message (e.g., a message carried on a path separate from the audio/video) is not necessary. Additionally, in some embodiments, the switching identifier 380 may maintain the compliance of both IP multicast and MPEG-2 transport stream video file definition.

As is known by those of skill in the art, each MPEG-2 Transport Stream (TS) may include video, audio and null packets, multiplexed together. Video packets containing start of I/IDR-frames and audio packets containing start of audio frames may be points at which a monitoring and/or switching device, e.g., adaptive switching component, can cleanly switch, e.g., from one stream to another. In such examples, the TS packets where the adaptive switching component can switch in may be marked in an adaptation header using e.g., a splicing point flag. As used herein, "switching identifier", "switching point", "splicing point", "splicing flag", etc. may all be used interchangeably to describe an identifier or flag that can be used to determine where to switch over to/from a particular content stream. The switching identifier may be as simple as an extra bit or may be complicated (e.g., may contain stream information, such as resolution, bit rate etc., that may be used by an adaptive switching component for switching decision or by client decoder for decoding adjustment). The switching identifiers may be located in every data packet or located at predetermined intervals, e.g., in packets every 10 seconds to 60 seconds.

Still referring to FIG. 3A, the switching identifier 380 may be carried in an IP header. For example, in the option field on an IP header, option values 26-29 are usually undefined and easily accessible. This accessibility may be beneficial for placing the switching identifier 380 and inspecting the switching identifier. In some embodiments, the switching identifier 380 may be easily inspected by hardware that provides the support of adaptive switching, e.g., the IP router or edge router (depicted by reference numeral 140 in FIG. 1) or the home gateway (depicted by reference numeral 160 in FIG. 1). In some embodiments, measures may be taken to ensure the option field is passed through the desired IP routing path. For example, in some embodiments, a specific traffic test may be run on all IP routes in order to maintain the IP option.

As shown in FIG. 3B, a program association table ("PAT") transport stream packet 330 is shown in an exploded view. Generally, PAT transport stream packet 330 includes PAT table 336 having a complete list of all programs in the transport stream along with the packet identifier ("PID") for the program map table ("PMT") for programs as well as the network information table ("NIT") for the transport stream.

In some embodiments, PAT transport stream packet 330 is the first packet of switch point or switch identifier 380, e.g., switch point 380 is at the beginning of PAT transport stream packet 330. In some embodiments, switch identifier 380 is carried as transport private data in the adaptation field 332 in the header 334 of PAT transport stream packet 330. Header 334 may be a 4-byte header that contains fields for packet synchronization and identification (e.g., a 13-bit PID). Generally, the adaptation field may carry synchronization and timing information for the decoding and presentation process. The adaptation field may also provide various indicators for random access points of compressed bit streams and for local program insertion. While not shown, various optional data fields may be included in the adaptation field, e.g., the data portion of the payload may include any multimedia data including compressed audio and video streams.

Alternatively, as shown in FIG. 3C, the switch identifier 380 may be carried as private data following the PAT table 336 in PAT transport stream packet 330. In some embodiments, a private message ID 338 may be used to indicate that it is a switch boundary or switch identifier 380.

Figure 4:
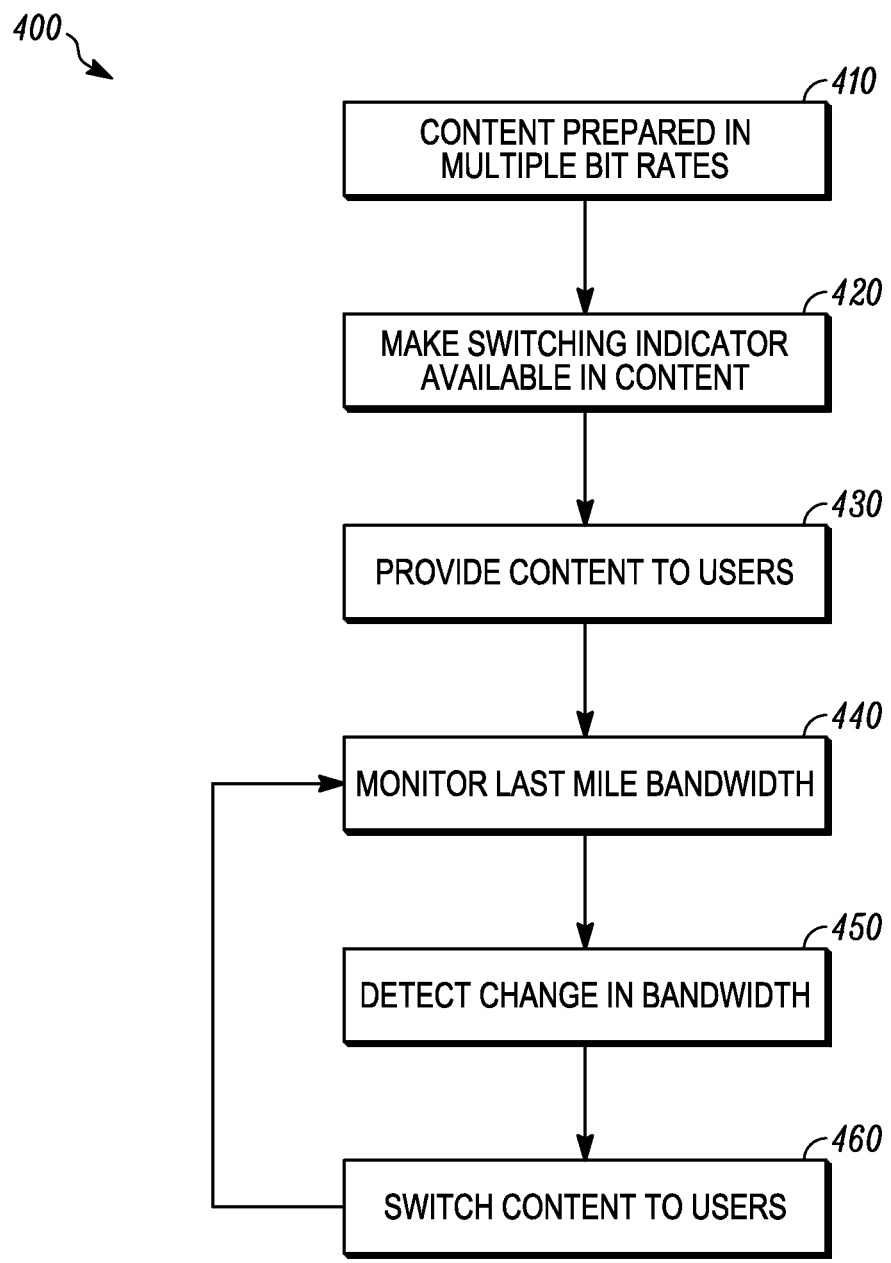
FIG. 4 is a flow chart that illustrates a method for multicast video streaming in accordance with an embodiment.

Referring now to FIG. 4, a flow chart illustrating a method 400 for multicast video streaming utilizing adaptive switching is shown. In a first step 410, content is prepared in multiple bit rates. An example of such content in multiple bit rates is shown in FIG. 2.

In traditional adaptive switching, a transcoder may prepare content in small segments or chunks. Then it is straight forward for the client to switch from one bit rate to another, based on the available bandwidth, by simply transferring from one chunk in bit rate 1 to the next chunk in bit rate 2. However, with multiple users who individually request chunks and the chunks that are created first before they can be requested and transferred, the traditional adaptive switching method has some issues in live event broadcasting. First, the media playback may be out of sync among users due to the chunks being delivered in unicast fashion per individual request. Second, the media playback may experience much longer delay, compared with current broadcast services, which may be explained in part because the media segment or chunk is not available for delivery until it is formed. Depending on the segment size, the time delay varies. Consequently, in some embodiments, a transcoder prepares the synchronization of content having multiple bit rates in a continuous stream, e.g., without chunking. For synchronization, it should be understood that the content packets from the different bit rates line up, such as shown in FIG. 2.

Thereafter, in a second step 420, a switching point or switching indicator is made available in the content packets. In some embodiments, a switching point is placed periodically in the content packets, e.g., once every 10 to 60 seconds worth of content. Alternatively, a switching point may be placed in each packet, or as desired.

In a third step 430, the content packets are provided to one or more clients or end users based on availability. This availability may be determined by bandwidth monitoring described in fourth step 440.

In a fourth step 440, the last mile bandwidth availability is monitored. In some embodiments, the bandwidth availability is continuously monitored. The monitoring may be performed by any suitable device, such as edge router 140 and/or home gateway 160. In monitoring the bandwidth, both the pipe size, e.g., the total bandwidth allowed in the transmission conduit, and the traffic state, e.g., the total bandwidth being used or consumed at any given time, may be inspected.

In a fifth step 450, a change in the bandwidth availability is detected. For example, a client may leave a program, freeing up available bandwidth. This example is discussed in further detail with respect to FIG. 5.

In a sixth step 460, the content provided to one or more clients is switched from one bit rate to another. The monitoring device may change the multicast IP header from the server side to map the one or more client listening to a media stream to a different multicast address at a different bitrate (e.g., aliasing). This aliasing function is transparent to the client. Alternatively or additionally, the monitoring device can send a "forced tune" to all clients listening on a particular network segment. All clients will request the content on a different multicast address. This example is also discussed in further detail with respect to FIG. 5.

As should be appreciated, steps 430-460 may occur nearly simultaneously. In some embodiments, it is through iterative and/or continuous monitoring and switching that the one or more clients may receive optimized content.

Figure 5:
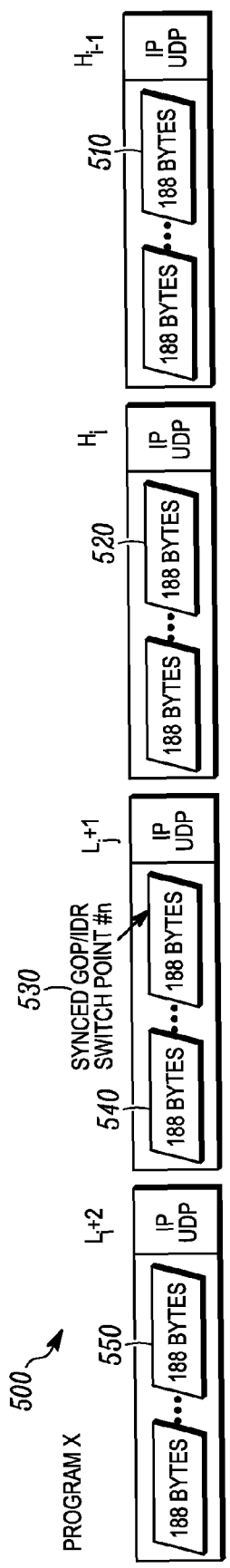
FIG. 5 is functional block diagram illustrating an example structure of a program utilizing adaptive switching for multicast content delivery in accordance with an embodiment.

Referring now to FIG. 5, a functional block diagram illustrating an example structure of a program utilizing adaptive switching for multicast content delivery is shown. In FIG. 5, a content stream 500 is shown having multiple bit rates in the same stream. In the content stream, two packets of a high bit rate 510, 520 and two packets of a low bit rate 540, 550 for the same program are shown.

As described above, the same program may be encoded in multiple bit rates in the network (or content source) side. In some embodiments, an adaptive switching component, e.g., plug-in, may be resident with the e.g., edge router 140 or IGMP server or IGMP proxy server as shown in FIG. 1.

When a client, e.g., decoder client, asks to "join" a program, the IGMP or IGMP proxy server with adaptive switching capabilities determines which bit rate stream to deliver per the current bandwidth status on the last mile network 150 from FIG. 1. If there is not enough bandwidth for a new channel, the IGMP server may consider switching the existing channels to a lower bit rate stream in order to support an additional new channel.

When a client, e.g., decoder client, "leaves" a program, the IGMP server with adaptive switching capabilities re-evaluates the bandwidth status of the last mile and may determine to switch the existing channels to a higher bit rate stream in order to offer better video quality.

In some embodiments, after the adaptive switching component has detected congestion (or sees congestion is relieved), it may be desirable to signal to the clients that they switch to a new stream. In such embodiments, the adaptive switching component may send a force-tune message e.g., out-of-band. As used herein, "out-of-band" simply means that the message is carried in a path separate from the multicast that the video/audio is being delivered. In some embodiments, the out-of-band message is a well-known multicast address that all can clients listen on. In some embodiments, the force-tune message is a way by which clients can be forced to tune away from the current multicast to a new one. The force-tune message generally includes the new multicast address.

In some embodiments, if it is determined that a change of bit rate is desirable, the IGMP server may take the IP router traffic and begins inspection of the GOP/I-frame switch identifier carried inside the IP packet (shown by reference numeral 530 in low bit rate packet 540). When the IGMP server finds an identifier match between the current bit rate stream and the switch-to bit rate stream, it stops the IP packet delivery of current bit rate stream before the GOP/I-frame switch point, and begins the IP packet delivery of the switch-to bit rate stream from the IP packet containing the GOP/I-frame switch point. As shown in FIG. 5, the transition from high bit rate packet 520 to low bit rate packet 540 appears seamless using adaptive switching.

Figure 6:
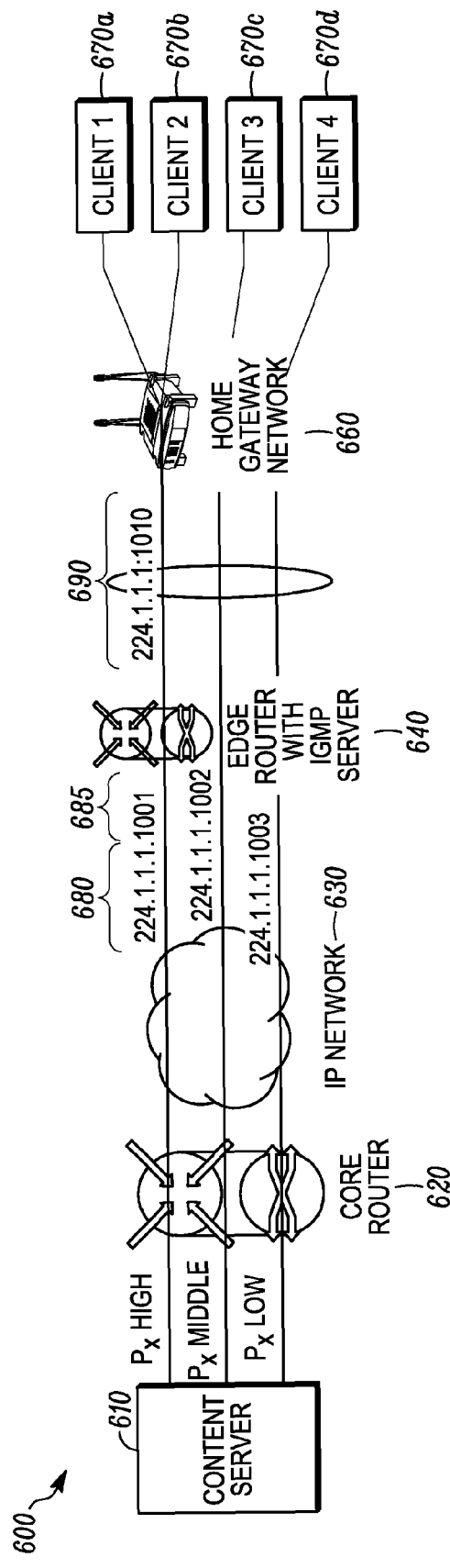
FIG. 6 is a functional block diagram illustrating an example flow of content in a system from a content server to a plurality of end users or clients in accordance with an embodiment.

Referring now to FIG. 6, an example flow of content in a system 600 from a content server to a plurality of end users or clients is shown. System 600 generally includes a content server 610, a core router 620, an IP network 630, an edge router 640, a home gateway 660, and one or more clients 670*a*, 670*b*, 670*c*, 670*d*.

In FIG. 6, all bit rate streams of a program are shown using the same IP multicast group address (depicted by reference numeral 680) with each bit rate stream using a different port number (depicted by reference numeral 685) for content delivery in network. On the client side, the same multicast IP group address can be used, e.g., reference numeral 680, but a new port number (depicted by reference numeral 690) may be used for client delivery. In some embodiments, the port conversion from network side to client side may be performed by the adaptive switching component.

Figure 7:
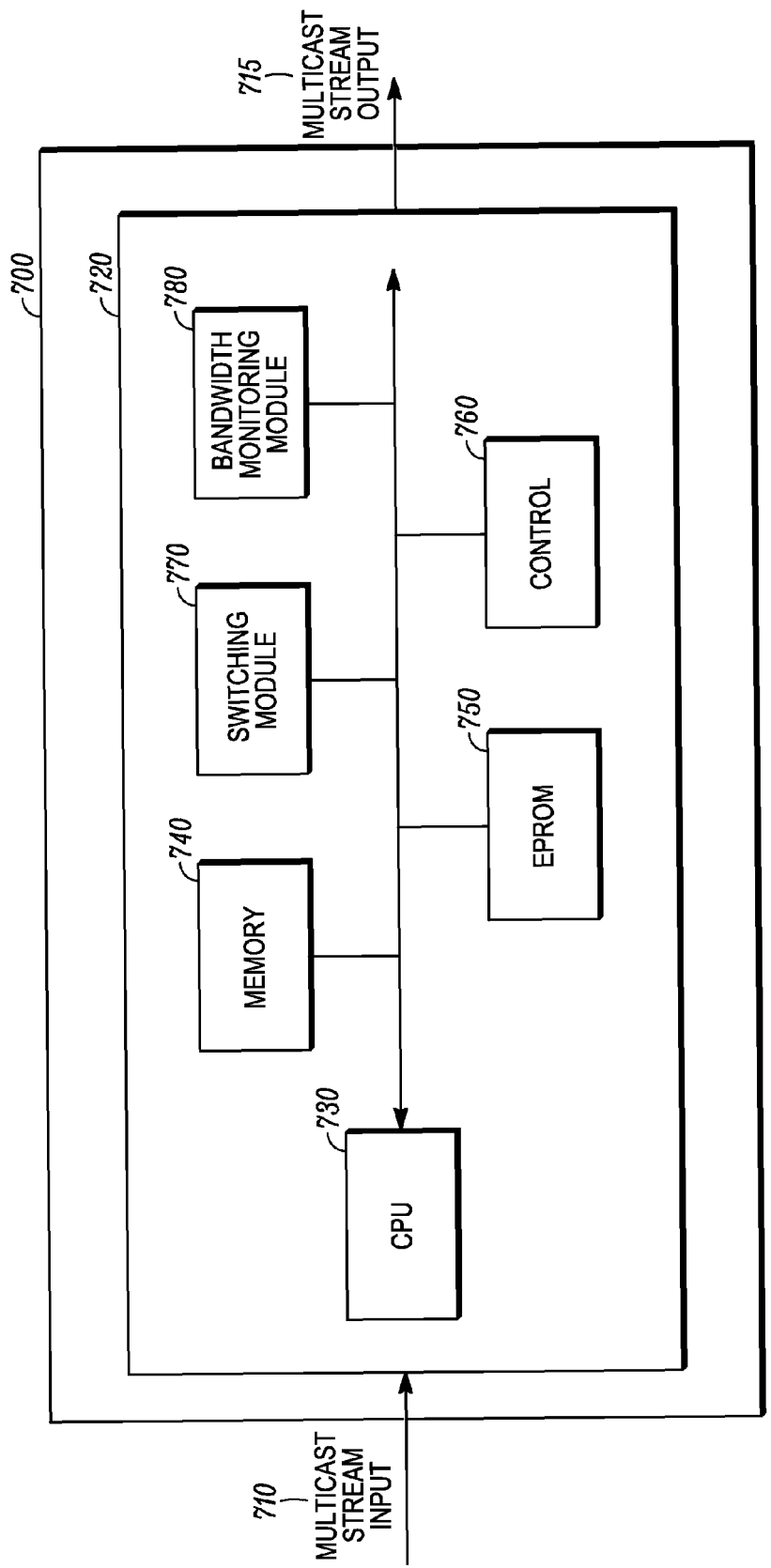
FIG. 7 is a functional block diagram illustrating an example structure of an adaptive switching component used in accordance with an embodiment.

FIG. 7 is a functional block diagram illustrating an example structure of an adaptive switching component ("ASC") used in accordance with some embodiments. As used herein, the ASC 700 is configured to perform the adaptive switching functions, described above with respect to FIGS. 4 and 5, for example. It may be appreciated that the ASC performs at least two tasks in the seamless switching of content streams being transmitted to the one or more users. First, there is the monitoring task, whereby both the pipe size, e.g., the total bandwidth allowed in the transmission conduit from the ASC to the users, and the traffic state, e.g., the total bandwidth being used or consumed at any given time by the users, may be monitored. Second, there is the switching/aliasing task, where, if the monitoring reveals that a content stream could or should be changed, the data packets are inspected for a switching indicator, and the currently transmitted content stream is replaced with a more desirable content stream at the switching indicator or point. These tasks will be described in more detail below.

The ASC may include components of a generic router/switch platform 720, including a control unit/controller or central processing unit ("CPU") 730, coupled with memory 740, EPROM 750, and control hardware 760. The ASC 700 may receive multicast streams via multicast stream input 710 and transmit multicast streams via multicast stream output 715. A communication unit (not shown) may be used in the interception and transmission of such multicast stream data. In some embodiments, the communication unit is integral to generic router 720.

CPU 730 may be a programmable processor configured to control the operation of ASC 700 and its components. For example, CPU 730 may be a microcontroller ("MCU"), a general purpose hardware processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration. Such operations, for example, may be stored and/or executed by memory unit 740.

Also present in the ASC 700 are switching module 770 and bandwidth monitoring module 780. While shown separately, one or both of these modules may be stored and/or executed by memory unit 740. In some embodiments, the ASC 700 may include a core router and/or an edge router and/or a home gateway. For example, in some embodiments, generic router 720 may include one or more of these components.

As used herein, a "core router" is an IP router that routes IP single-cast and multi-cast packets in the "core" or of the IP distribution network. Edge routers connect to the core network. Generally, these core routers are managed by "backbone" Wide Area Network ("WAN") service providers. Interconnection bandwidths may be in the 10's of Gigabits (or much more) and run switching protocols such as Multi-Protocol Label Switching ("MPLS").

As used herein, an "edge router" is an IP router that connects access routers to the core network and routes IP single-cast and multi-cast packets in the "edge" of the IP distribution network. Edge routers are generally managed by Internet Service Providers ("ISP") and may still be considered the WAN part of the network, but in general not the "backbone". Interconnection bandwidths to access networks vary over a wide range depending on last mile bandwidth and are generally in the Megabit to multi-Megabit range for residential access networks. Bandwidths for enterprises (e.g., commercial business) can be significantly larger. Edge routers generally run the IP Group Management Protocol ("IGMP") for hosts on access network to acquire multicast traffic.

As used herein, a "home gateway ("HGW")" router or access network router is generally located within the residence (or enterprise) and provides Local Area Network ("LAN") services such as security firewalls, network address translation ("NAT"), local IP host address assignment (e.g., dynamic host configuration protocol "DHCP") etc. Bandwidths may be in the multi-Megabit (e.g., Wi-Fi) to Gigabit (e.g., Gigabit Ethernet) range. HGW devices may take the form of generic Wi-Fi routers, Set top boxes ("STBs"), integrated cable modems or digital subscriber line ("DSL") customer premises equipment ("CPE")-generic routers, or the like.

While not specifically shown, ASC 700 may include additional hardware and software typical of computer systems (e.g., power, cooling, operating system) is desired. In other implementations, different configurations of ASC 700 can be used (e.g., different bus or storage configurations or a multi-processor configuration). Some implementations include one or more computer programs executed by a programmable processor or computer. In general, each computer may include one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

As mentioned above, ASC 700 performs at least two functions. The first is the "network bandwidth monitoring" function. This function determines when there is a need to either reduce or increase a stream's bandwidth based on prevailing segment conditions or congestion. Various bandwidth monitoring algorithms may be used to achieve sufficient bandwidth monitoring. In an example, bandwidth is monitored for an entire network segment and all of the hosts connected to that segment. In some embodiments, the network bandwidth monitoring function is achieved using bandwidth monitoring module 780.

The second function is the "multicast stream alias/switching" function. This function does the inspection of the incoming multicast contribution streams, looks for appropriate switching points and either aliases the stream to the ongoing segment multicast address (e.g., that multicast address the client host joined), or sends a force tune to all of the clients on that segment. The "alias" function merely maps the contribution stream (e.g., on multicast address "A") that meets the aggregate network segment bandwidth constraints to multicast address "B" on the local segment to which the client/host is listening. There is no need for the client to switch between multicast addresses for the alias solution. The client may transparently receive a new multicast stream (same content) at a different bitrate and render that stream in a seamless manner. For the force tune solution, all client/hosts may be instructed to tune to a new address. In some embodiments, there may be a change in the quality of the content the end user of the host/client sees depending upon the amount of change in the stream bitrate. It may increase or decrease in apparent quality proportional to an increase or decrease in multicast stream bandwidth on that segment. However, small changes in bitrate may not be perceivable to the program being rendered. In some embodiments, the multicast stream alias/switching function is achieved using switching module 770.

Although the ASC 700 is shown as containing both the bandwidth monitoring module 780 and the switching module 770, the functions achieved by these modules may be distributed in the network for optimization and scalability. As an example, the "multicast stream alias/switching" function may be suited to be located in the edge router, thereby optimizing bandwidth utilization on the "last mile" between an edge router and a HGW router. The "network bandwidth monitoring" function may be suited to be located in the HGW, since in general many HGWs connect to the serving edge router. The bandwidth monitoring function may be CPU-cycle intensive depending upon the complexity of the algorithm used and may be better suited to be distributed across all of the connected HGWs. Various other placements of these functions in the network are also contemplated.

It may be appreciated that the home gateway may be configured to perform both the monitoring and switching tasks. Alternatively, the edge router may be configured to perform both the monitoring and switching tasks. However, in some embodiments, it may be desirable to split the tasks between the home gateway and edge router. For example, the home gateway may be configured to perform the bandwidth monitoring task and the edge router may be configured to perform the switching task. In such an example, the home gateway may monitor the last mile bandwidth and for a user and place a request to the edge router. If the edge router can meet the request of the home gateway, the edge router may select a suitable content stream and transmit it to the home gateway and on to the user. This monitoring and switching/transmitting process may be continuous, intermittent, or whatever the ASC is set to perform. A further example is provided below.

EXAMPLE

There are two functions that support the bit rate switching of adaptive streaming: the traffic monitoring (label as "M") and the stream switching (labeled as "S"). These two function components (M and S) can be located at same place, such as inside the ASC in an edge server, or be separated. For example, the monitoring function is done by the home gateway and reported to the ASC in edge server, while the switching function is in edge server. A series of possible combinations are listed below:

| Edge Server | Home Gateway | Clients |
|---|---|---|
| (1) M + S | | |
| (2) S | M | |
| (3) | M + S | |
| (4) M | | S |
| (5) | M | S |
| (6) | | M + S |
| (7) S | | M |

In some embodiments, the second (2) or seventh (7) combination is preferable because it may leverage the distributed home gateway or client device for monitoring effort, and does the switching in edge server to eliminate the bandwidth overlay of switching-from and switching-to during bit rate switch is processed. In some embodiments, in cases of (3), (4) and (5), when a switching is desired, the home gateway or the client may ask for both bit rate streams in order to conduct a switch, thus momentarily (e.g., from beginning of request for switching to complete of switching) both the switching-from and the switching-to streams may be sent from edge server to client.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

We claim:

1. A method for adaptively transmitting content to one or more users based on currently available bandwidth via internet protocol ("IP") multicast protocol, the method comprising:
receiving a first content stream having a first plurality of data packets, the first content stream encoded at a first bit rate and including a first plurality of switching identifiers placed at predetermined time intervals in the first content stream;
receiving a second content stream having a second plurality of data packets, the second content stream encoded at a second bit rate and including a second plurality of switching identifiers placed at predetermined time intervals in the second content stream, wherein the first bit rate is different than the second bit rate and wherein the first and second content streams represent the same content;
transmitting the first content stream to a client device for providing the content to the client device;
receiving an indication of available bandwidth for transmitting data to the client device;
responsive to receiving the indication of available bandwidth, determining, during transmission of the first content stream, to switch from the first content stream to the second content stream for providing the content to the client device;
responsive to determining to switch, searching the first plurality of data packets for a switch identifier from the first plurality of switching identifiers;
responsive to identifying a first switching identifier based on the searching, transmitting the second content stream to the client device starting with a data packet from the second plurality of data packets that includes a second switching identifier from the second plurality of switching identifiers, the second switching identifier corresponding to the first switching identifier.

2. The method of claim 1, wherein the packets in the first content stream are aligned with the corresponding packets in the second content stream.

3. The method of claim 1, wherein the first plurality of switching identifiers are aligned with the corresponding switching identifiers from the second plurality of switching identifiers.

4. The method of claim 1, wherein each switching identifier from the first plurality and the second plurality of switching identifiers is located in at least one of a header portion or a transport packet portion of a data packet.

5. The method of claim 4, wherein, within the header portion, a switching identifier is located in an option field.

6. The method of claim 4, wherein, within the transport packet portion, a switching identifier is located with a program association table.

7. The method of claim 1, wherein the data packets in both the first and second content streams comprise at least one of compressed video or compressed audio data.

8. The method of claim 1, wherein only one content stream is transmitted to the client device at any time.

9. The method of claim 1, wherein switching from the first content stream to the second content stream is performed transparently for the user.

10. The method of claim 1, wherein transmitting the second content stream to the client device is achieved via force-tuning, whereby a user is signaled on the client device to switch to a new multicast channel to receive the second content stream.

11. The method of claim 10, wherein an out-of-band message is used to signal the user to switch to the new multicast channel.

12. The method of claim 1, where each switch identifier from the first plurality of switching identifiers is an extra bit included in the first content stream.

13. The method of claim 1, where each switch identifier from the first plurality of switching identifiers includes one or more of the following: a resolution of the first content stream and the first bit rate.

14. A system for adaptively transmitting content to one or more users, the system comprising:
a content server configured to:
transmit a first data stream having a first plurality of data packets and encoded at a first bit rate, the first content stream including a first plurality of switching identifiers placed at predetermined time intervals in the first content stream; and
transmit a second data stream having a second plurality of data packets and encoded at a second bit rate, the second data stream including a second plurality of switching identifiers placed at predetermined time intervals in the second content stream, wherein the first bit rate and the second bit rate are different and wherein the first and second data streams represent the same content; and an edge router configured to:
receive the first and second data streams from the content server;
transmit the first data stream to a client device for providing the content to the client device;
receive an indication of available bandwidth for transmitting data to the client device;
responsive to receiving the indication of available bandwidth, determining, during transmission of the first content stream, to switch from the first content stream to the second content stream for providing the content to the client device;
responsive to determining to switch, searching the first plurality of data packets for a switch identifier from the first plurality of switching identifiers;
responsive to identifying a first switching identifier based on the searching, transmit the second content stream to the client device starting with a data packet from the second plurality of data packets that includes a second switching identifier from the second plurality of switching identifiers, the second switching identifier corresponding to the first switching identifier.

15. The system of claim 14, further comprising:
a home gateway configured to:
monitor bandwidth being used by the client device; and
relay bandwidth information to the edge router indicating available bandwidth.

16. The system of claim 15, wherein the home gateway determines a change in the bandwidth being used.

17. An electronic device for adaptively transmitting content to one or more users comprising:
a computer processor; and
a computer-readable storage medium containing computer program code executed by the computer processor for:
receiving a first content stream having a first plurality of data packets, the first content stream encoded at a first bit rate and including a first plurality of switching identifiers placed at predetermined time intervals in the first content stream;
receiving a second content stream having a second plurality of data packets, the second content stream encoded at a second bit rate and including a second plurality of switching identifiers placed at predetermined time intervals in the second content stream, wherein the first bit rate is different than the second bit rate and wherein the first and second content streams represent the same content;
transmitting the first content stream to a client device for providing the content to the client device;
receiving an indication of available bandwidth for transmitting data to the client device;
responsive to receiving the indication of available bandwidth, determining, during transmission of the first content stream, to switch from the first content stream to the second content stream for providing the content to the client device;
responsive to determining to switch, searching the first plurality of data packets for a switch identifier from the first plurality of switching identifiers;
responsive to identifying a first switching identifier based on the searching, transmitting the second content stream to the client device starting with a data packet from the second plurality of data packets that includes a second switching identifier from the second plurality of switching identifiers, the second switching identifier corresponding to the first switching identifier.

* * * * *

UNITED STATES PATENT AND TRADEMARK OFFICE
CERTIFICATE OF CORRECTION

PATENT NO.       : 9,313,138 B2
APPLICATION NO.  : 13/588852
DATED            : April 12, 2016
INVENTOR(S)      : Sun et al.

It is certified that error appears in the above-identified patent and that said Letters Patent is hereby corrected as shown below:

On the Title Page, Item (75) Inventors, should read

-- (75)  Inventors:   Wendell Sun, San Diego, CA (US);
                                         Steven Anderson, San Diego, CA (US);
                                         Dinkhar Bhat, Princeton, NJ (US);
                                         Niranjan Samant, Landsdale, PA (US) --.

Signed and Sealed this
Twenty-eighth Day of June, 2016

Michelle K. Lee
*Director of the United States Patent and Trademark Office*